Figure 1:
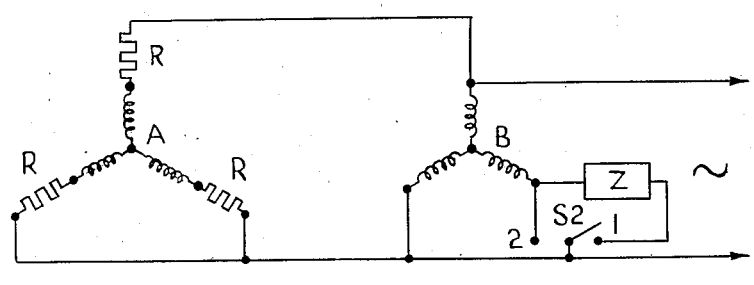

Dec. 9, 1958  SHAFI-UDDIN AHMED CHOUDHURY  2,864,045
SINGLE PHASE POWER SELSYN DRIVE
Filed March 1, 1955

INVENTOR
SHAFI-UDDIN AHMED CHOUDHURY
By
ATTORNEY

United States Patent Office 2,864,045
Patented Dec. 9, 1958

2,864,045

SINGLE PHASE POWER SELSYN DRIVE

Shafi-uddin Ahmed Choudhury, Rugby, England, assignor to The British Thomson-Houston Company Limited, a British company Application March 1, 1955, Serial No. 491,426

Claims priority, application Great Britain March 28, 1954

5 Claims. (Cl. 318—44)

This invention relates to the operation of dynamo-electric machines in mutual synchronism under running conditions on a single phase supply.

One type of dynamo-electric machine capable of running in mutual synchronism with another similar machine at any speed is provided with a polyphase winding on the stator and a single-phase salient-pole rotor, and in order for the machines to operate in synchronism, the polyphase windings are inter-connected phase-to-phase and the single-phase windings connected together and to a single-phase supply.

Another type of machine adapted to operate on a polyphase supply is provided with polyphase windings on both stator and rotor, as is the case with polyphase slipring induction motors, and in order for the machines to operate in mutual synchronism, the corresponding windings of the machines are interconnected and one or other of the inter-connected windings are connected to the polyphase supply. In this way the currents in the interconnected windings of one machine circulate from the corresponding winding of the other machine and produce a synchronising torque which holds the two machines in mutual synchronism.

In the first-mentioned type of machine, whilst the connections are usually made while the machines are both at a standstill and are run up in synchronism, it is possible to run up the one machine, the receiving machine from standstill with the other, or transmitting, machine when the transmitting machine is in rotation provided that the load on the receiving machine is relatively small. But where the load is appreciable, the polyphase type of machine is to be preferred to the salient-pole type.

When using the polyphase type of machine, arrangements have been proposed whereby the receiver machine can be brought up from standstill to synchronise with the transmitting machine if suitable precautions are taken, as mentioned in my co-pending application Serial No. 420,158 filed March 31, 1954, now abandoned, but only if polyphase source of supply is available.

The object of the present invention is to provide a means for operating machines of the polyphase type in mutual synchronism from a single-phase supply.

For synchronising, on a singlephase supply, a controlling or transmitter dynamo-electric machine having three-phase primary and secondary windings with at least one other similar controlled machine, two phases of the primary windings of the transmitting machine being connected at their outer ends to form a short-circuit on the quadrature axis and to provide a loop connection for circulating currents. The short-circuit and remaining phase winding connections are connected to the single-phase supply. According to the invention the corresponding primary and secondary windings of the controlling and controlled machines are interconnected, the windings on the controlled machine corresponding with those of the controlling machine which are short-circuited on the quadrature axis being initially connected through a phase-splitting impedance which is open-circuited or short-circuited when synchronisation has been effected to make the controlled machine exactly the same as that of the controlling machine.

In order to cause the ratio of the synchronising torque to the motoring torque of the controlled machine to be maintained as high as possible during the accelerating period, impedance is connected in series in each phase of the controlling machine as disclosed in prior application Serial No. 420,158 to which reference has previously been made.

Figure 2:
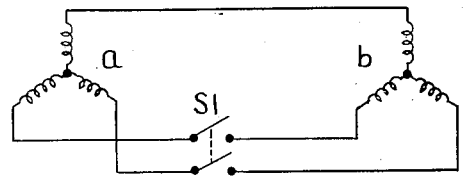
Figure 2:
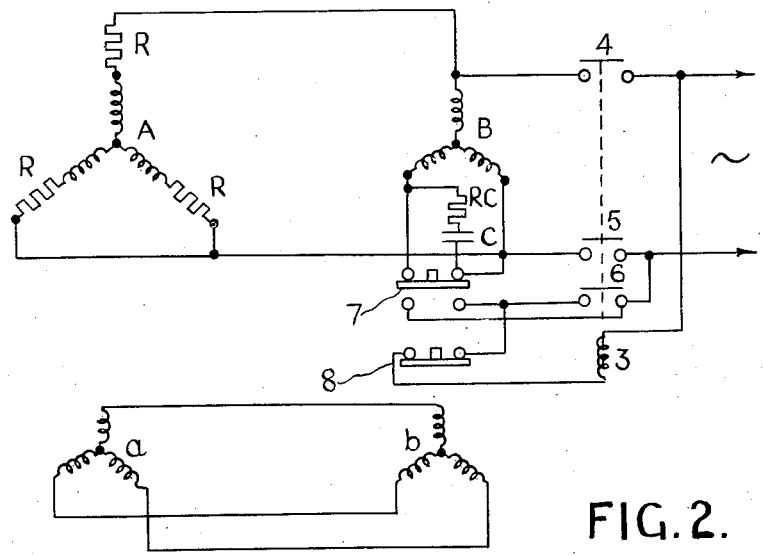

The invention will be more readily understood with reference to the accompanying drawings, in which Figs. 1 and 2 show two arrangements in accordance therewith.

Referring firstly to Fig. 1, A represents the primary winding of the controlling machine, the secondary of which is shown at $a$. The secondary winding will, in operation, be driven at any required speed. The primary of the controlled machine which is stationary is shown at B and its secondary at $b$. The primary windings of the machines are shown as wound for 3-phase, but ultimately two of the terminals are short-circuited to form a short-circuit in quadrature axis.

One phase of winding B has connected to it, a phase-splitting impedance Z. This impedance may consist of a resistance, a capacitor or choke or any combination of them. A switch $S_2$ is arranged to connect one supply line either to the free end of the impedance, when impedance Z is in series with one phase of winding B, or directly to the end of that phase of winding B. A two-pole switch $S_1$ is arranged to connect or disconnect the tie between the two secondaries $a$ and $b$.

With the controlling machine A$a$ in operation, in order to start and synchronise therewith the stationary controlled machine B$b$ all that is required is to close switch $S_1$ and close switch $S_2$ on to contact 1, thus connecting impedance Z in series with one phase of winding B. The controlled machine will then run up and automatically synchronise with the controlling machine. The switch $S_2$ is then changed over on to contact 2. The value of the phase splitting impedance is adjusted to give the minimum torque necessary for acceleration.

Referring now to Fig. 2, this shows a simple scheme using an electro-magnetic contactor and two switches, preferably of the push button type, to enable the controlled machine to be switched "on" and "off" at will. The contactor has an operating coil 3 and three normally open contacts 4, 5 and 6, the last being a retaining contact bridging the "on" push button switch 7 as shown. The controlled machine is switched off by pressing the "off" push button 8 which opens the energising circuit for coil 3. The phase splitter is shown as a capacitor C in series with a resistance R$c$.

To supply voltage to the apparatus, it is necessary to depress and hold the push button switch 7 down until the synchronisation is complete. During this time the contactor closes and the machine B$b$ starts up in the same way as a capacitor motor and automatically synchronises with the controlling machine. When the push button 7 is released after two or three seconds the phase splitter is short-circuited and the two machines have symmetrical connections which is necessary to prevent unnecessary circulating current.

Since the connection of the single-phase supply to the controlling and controlled machines is effected through the contactor, the switch $S_1$ of the Fig. 1 arrangement is rendered unnecessary and is omitted, the secondary polyphase windings of the machine being permanently interconnected.

It is to be understood that although the windings of the machines have been shown as star-connected the invention can equally well be applied to a delta-connected machine. In this case, the single-phase circuit is connected to two terminals of the delta-connected winding, and the third terminal is connected to one of the others so as to short-circuit on the quadrature axis.

What I claim as new and desire to secure by Letters Patent of the United States is:

1. A method for bringing into mutual synchronism on a single-phase supply a running controlling dynamo-electric machine having three-phase primary and secondary windings arranged on the stator and rotor and at least one other similar controlled machine initially at standstill, each phase of the primary windings of the controlling machine having impedance in series therewith, two phases of the primary windings of the controlling machine being connected at their outer ends to form a loop connection for circulating current, said loop connection and the remaining phase winding connection being connected to the supply, which comprises inter-connecting the corresponding primary and secondary windings of the controlling and controlled machines, one of those primary windings of the controlled machine which correspond with one of the loop connected windings of the controlling machine being initially connected to said single-phase supply through a phase-splitting impedance which is open-circuited when synchronisation has been obtained.

2. A method as claimed in claim 1, in which the inter-connection of the primary windings of the controlling and controlled machines and their connection to the supply is effected by the contacts of a contactor the operating winding of which is energisable from the supply through a control switch having contacts which alternatively complete a circuit for the energising winding of the contactor and the corresponding loop connected windings of the controlled machine.

3. A method as claimed in claim 2, in which the circuit for energising the operating winding of the contactor is provided with retaining contacts which are opened to de-energise the contactor.

4. An arrangement for synchronising with a running controlling dynamo-electric machine having 3-phase star-connected primary and secondary windings, at least one other similar controlled machine, two phases of the primary windings of the controlling machine being connected at their outer ends to form a loop connection for circulating currents, said loop connection and remaining phase winding connection being connected to a single-phase supply, comprising impedance connected in series in each phase of the controlling machine to cause the ratio of the synchronised torque to the motoring torque of the controlled machine to be maintained high during the accelerating period, means for completing connections between the secondary windings of the machine, and means for interconnecting the primary windings of the controlled machine with those of the controlling machine, said means connecting the windings on the controlled machine corresponding with the loop connected windings of the controlling machine initially through a phase-splitting impedance which is short-circuited when the controlled machine is synchronised with the controlling machine.

5. A method for bringing into mutual synchronism on a single-phase supply a running controlling dynamo-electric machine having three-phase primary and secondary windings arranged on the stator and rotor and at least one other similar controlled machine initially at standstill, two phases of the primary windings of the controlling machine being connected at their outer ends to form a loop connection for circulating currents, said loop connection and the remaining phase winding connection being connected to the supply which comprises inter-connecting the corresponding primary and secondary windings of the controlling and controlled machines, one of those primary windings of the controlled machine which correspond with one of the loop connected windings of the controlling machine being initially connected to said supply through a phase-splitting impedance which is short-circuited when synchronisation has been obtained.

References Cited in the file of this patent

UNITED STATES PATENTS 1,937,375    Woodward    Nov. 28, 1933

FOREIGN PATENTS 717,653    France    Oct. 20, 1931
658,965    Great Britain    Oct. 17, 1951

OTHER REFERENCES

Servomechanism Fundamentals, Lauer, Lesnick, Matson, Figs. 2, 10, p. 31, McGraw-Hill, 1947.